United States Patent Office 3,632,862
Patented Jan. 4, 1972

3,632,862
PHENYLTHIOVINYL PHOSPHOROTHIOATES AND THEIR METHOD OF PREPARATION
Roger William Addor, Pennington, and Thomas Walter Drabb, Jr., Trenton, N.J., assignors to American Cyanamid Company, Stamford, Conn.
No Drawing. Filed Mar. 17, 1969, Ser. No. 808,006
Int. Cl. C07f 9/16; A01n 9/36
U.S. Cl. 260—949    10 Claims

ABSTRACT OF THE DISCLOSURE

The insecticidal and acaricidal compounds have the formula:

$$\begin{array}{c} R_1O \\ \diagdown \\ R_2O \end{array} \!\!\! \overset{S}{\underset{\|}{P}}\!\!-\!\!O\!-\!\!\overset{R_3}{\underset{|}{C}}\!\!=\!\!CH\!-\!S\!-\!\!\!\bigcirc\!\!\!-(X)_m$$

and include the trans and cis isomeric forms of the above compound as well as mixtures of the trans and cis isomers wherein:

$R_1$, $R_2$, $R_3$ are each lower alkyl,
X is chloro, fluoro, or nitro,
$m$ is 0 or 1, except that when X is chloro, $m$ is 1 to 3.

The compounds are prepared by reaction of an α-phenylthioketone with a phosphorothioate compound in the presence of an inert reaction solvent and certain strong bases.

SUMMARY OF THE INVENTION

This invention relates to phenylthiovinyl phosphorothioate compounds of the formula:

$$\begin{array}{c} R_1O \\ \diagdown \\ R_2O \end{array} \!\!\! \overset{S}{\underset{\|}{P}}\!\!-\!\!O\!-\!\!\overset{R_3}{\underset{|}{C}}\!\!=\!\!CH\!-\!S\!-\!\!\!\bigcirc\!\!\!-(X)_m \quad (I)$$

wherein:

$R_1$, $R_2$, $R_3$ are each lower alkyl,
X is chloro, fluoro, or nitro, and
$m$ is 0 to 1, except that where X is chloro, $m$ is 1 to 3.

The compounds represented by Formula I may exist in either a trans or a cis isomeric form as shown by the formulae presented below:

(trans form)

and (cis form)

It is to be understood that the compounds embraced by chemical Formula I include either the trans or cis form as well as mixtures of the trans and cis forms.

This invention also relates to the usage of the above compounds as insecticides, acaricides, and nematocides.

The term "lower alkyl" means straight and branched saturated hydrocarbon chains containing from 1 to 4 carbon atoms; illustrative members include methyl, ethyl, n-propyl, isopropyl, n-butyl, sec-butyl and tert-butyl.

BACKGROUND OF THE INVENTION

South African patent 66/5096 discloses phosphates of the formula:

$$\begin{array}{c} R_1O \\ \diagdown \\ R_2O \end{array} \!\!\! \overset{O}{\underset{\|}{P}}\!\!-\!\!O\!-\!\!\overset{R_3}{\underset{|}{C}}\!\!-\!\!\overset{}{\underset{H}{C}}\!\!-\!\!S\!-\!\!\!\bigcirc\!\!\!-(X)_m$$

wherein $R_1$, $R_2$ and $R_3$ are as defined above, and wherein X is halogen (chloro or bromo) or lower alkyl and $m$ is 0 to 3. Such phosphates (P=O) are similar to the phosphorothioates (P=S) of this invention in cases where X may be chloro (chlorophenyl) or $m$ may be zero (phenyl). However, the phosphorothioates of this invention wherein X is chloro or $m$ is zero exhibit unusual insecticidal activity against certain insect species which is not shown by the relates phosphates of the above reference. More particularly, the phenyl and chlorophenyl phosphorothiates of this invention show unusually high potency towards mosquito larvae and the insects of the difficultly controlled "cotton complex." The term "cotton complex" as used herein means insects selected from the group consisting of lygus, boll weevil, bollworm and tobacco budworm. This unusual activity is demonstrated by comparative data presented hereinbelow. There is no known relevant prior art in regard to the phosphorothiates of this invention where X may be fluoro or nitro.

Other references disclosing more remotely related prior art compounds are U.S. Pats. 2,864,740; 2,864,741; 2,954,320; 2,954,316 and Belgian Pat. 702,716.

DESCRIPTION OF THE PREFERRED EMBODIMENTS

Compounds

The following compounds are illustrative of the compounds of this invention (Substituents refer to Formula I).

| | | | X | | |
|---|---|---|---|---|---|
| $R_1$ | $R_2$ | $R_3$ | 2 or 6[1] | 4[1] | 3 or 5[1] |
| $CH_3$ | $CH_3$ | $CH_3$ | F | | |
| $CH_3$ | $CH_3$ | $CH_3$ | | F | |
| $CH_3$ | $CH_3$ | $CH_3$ | | | F |
| $CH_3$ | $CH_3$ | $CH_3$ | $NO_2$ | | |
| $CH_3$ | $CH_3$ | $CH_3$ | | $NO_2$ | |
| $CH_3$ | $CH_3$ | $CH_3$ | | | $NO_2$ |
| $CH_3$ | $CH_3$ | $CH_3$ | Cl | | |
| $CH_3$ | $CH_3$ | $CH_3$ | | Cl | |
| $CH_3$ | $CH_3$ | $CH_3$ | | | Cl |
| $CH_3$ | $CH_3$ | $CH_3$ | Cl | Cl | |
| $CH_3$ | $CH_3$ | $CH_3$ | | Cl | Cl |
| $CH_3$ | $CH_3$ | $CH_3$ | Cl | | Cl |
| $C_2H_5$ | $C_2H_5$ | $CH_3$ | F | | |
| $C_2H_5$ | $C_2H_5$ | $CH_3$ | | F | |
| $C_2H_5$ | $C_2H_5$ | $CH_3$ | | | F |
| $C_2H_5$ | $C_2H_5$ | $CH_3$ | $NO_2$ | | |
| $C_2H_5$ | $C_2H_5$ | $CH_3$ | | $NO_2$ | |
| $C_2H_5$ | $C_2H_5$ | $CH_3$ | | | $NO_2$ |
| $C_2H_5$ | $C_2H_5$ | $CH_3$ | Cl | | |
| $C_2H_5$ | $C_2H_5$ | $CH_3$ | | Cl | |
| $C_2H_5$ | $C_2H_5$ | $CH_3$ | | | Cl |
| $C_2H_5$ | $C_2H_5$ | $CH_3$ | Cl | Cl | |
| $C_2H_5$ | $C_2H_5$ | $CH_3$ | | Cl | Cl |
| $C_2H_5$ | $C_2H_5$ | $CH_3$ | Cl | | Cl |
| $CH_3$ | $C_2H_5$ | $CH_3$ | F | | |
| $CH_3$ | $C_2H_5$ | $CH_3$ | | F | |
| $CH_3$ | $C_2H_5$ | $CH_3$ | | | F |
| $CH_3$ | $C_2H_5$ | $CH_3$ | $NO_2$ | | |
| $CH_3$ | $C_2H_5$ | $CH_3$ | | $NO_2$ | |
| $CH_3$ | $C_2H_5$ | $CH_3$ | | | $NO_2$ |
| $CH_3$ | $C_2H_5$ | $CH_3$ | Cl | | |
| $CH_3$ | $C_2H_5$ | $CH_3$ | | Cl | |
| $CH_3$ | $C_2H_5$ | $CH_3$ | | | Cl |
| $CH_3$ | $C_2H_5$ | $CH_3$ | Cl | Cl | |
| $CH_3$ | $C_2H_5$ | $CH_3$ | | Cl | Cl |

| R₁ | R₂ | R₃ | X | | |
|---|---|---|---|---|---|
| | | | 2 or 6[1] | 4[1] | 3 or 5[1] |
| CH₃ | C₂H₅ | CH₃ | Cl | | Cl |
| n-C₃H₇ | n-C₃H₇ | C₂H₅ | F | | |
| n-C₃H₇ | n-C₃H₇ | C₂H₅ | | NO₂ | |
| n-C₃H₇ | n-C₃H₇ | C₂H₅ | | | Cl |
| n-C₃H₇ | n-C₃H₇ | C₂H₅ | Cl | Cl | |
| n-C₃H₇ | n-C₃H₇ | C₂H₅ | | Cl | Cl |
| n-C₃H₇ | n-C₃H₇ | C₂H₅ | Cl | | Cl |
| n-C₃H₇ | n-C₃H₇ | C₂H₅ | | F | |
| n-C₃H₇ | n-C₃H₇ | C₂H₅ | | | F |
| CH₃ | CH₃ | n-C₃H₇ | F | | |
| CH₃ | CH₃ | n-C₃H₇ | | NO₂ | |
| CH₃ | CH₃ | n-C₃H₇ | | | Cl |
| CH₃ | CH₃ | n-C₃H₇ | Cl | Cl | Cl |
| C₂H₅ | C₂H₅ | H | Cl | Cl | Cl |
| CH₃ | C₂H₅ | H | Cl | Cl | Cl |
| n-C₃H₇ | n-C₃H₇ | CH₃ | Cl | Cl | Cl |
| CH₃ | CH₃ | C₂H₅ | Cl | Cl | Cl |

[1] Denotes position on the phenyl ring in accordance with the numbering of Formula (I).

Process

The compounds of this invention are conveniently prepared by reacting an α-phenylthioketone of the formula:

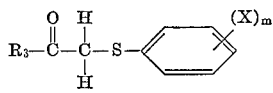

with a phosphorothioate compound of the formula:

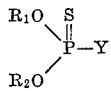

wherein R₁, R₂, R₃, X and m are as defined above and Y is halo (chloro, bromo, fluoro, iodo) in the presence of an inert organic solvent and a strong base selected from the group consisting of alkali metal hydroxides, alkali metal alkoxides, and tetra(lower)alkylammonium hydroxides.

In general, the trans form of the inventive compounds appears to have greater insecticidal and acaricidal activity than the cis form. It therefore becomes desirable to prepare a product mixture containing as much of the trans form as possible. It has been found that when the reaction is carried out, as described above, in more polar solvents, a reaction mixture enriched in the trans form of the compound results.

Illustrative reaction solvents are dimethylformamide, dimethylsulfoxide, dimethylacetamide, acetonitrile, and the tetrahydrosulfolanes such as tetrahydrothiophene dioxide. Dimethylformamide is a preferred solvent.

Suitable bases are potassium tertiary butoxide, sodium methoxide, sodium propoxide, sodium hydroxide, potassium hydroxide, and tetramethylammonium hydroxide. Potassium hydroxide and sodium hydroxide are preferred bases. A preferred amount of base is about 0.9 to about 1.1 moles per mole of reactant.

A preferred solvent base system is dimethylformamide and either sodium hydroxide or potassium hydroxide due to the high yields and cleaner reaction products resulting therefrom.

The reaction proceeds at temperatures between 0° C. and 100° C. However, a temperature range of 10 to 40° C. is preferred. The reaction can be run at subatmospheric, atmospheric, or superatmospheric pressure, with atmospheric pressure preferred.

All of the required reactants are either readily available on a commercial basis or can be readily prepared by techniques well known to those skilled in the art. Preferably Y will be chloro in the phosphorothioate reactant due to the commercial availability of these particular compounds.

The process of this invention ordinarily produces a mixture of the trans and cis forms of the inventive compounds as discussed above. Substantially pure, i.e., 90% or more, trans or cis compounds can be obtained, however, using well known isomer separation techniques such as, for example, chromatography on selective solid substrates such as magnesium silicate.

Utility

The compounds of this invention are useful for controlling a variety of insects and acarina such as those shown in the examples provided hereinbelow. They may be applied to the foliage of plants as dusts or liquid sprays to protect them from pests which feed thereon; they may also be incorporated in or applied to the soil in order to protect germinating and growing plants from soil-borne pests which attack the root systems and stems of said plants; or they may be applied to the breeding sites of pests to control both the larvae and adult stages of breeding pest populations. In the latter situations the compounds may be applied in conventional formulations such as dusts, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica, charcoal, activated carbon or other inert powders. As a wettable powder, the compounds of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of hydrocarbon solvent such as Panasol An-5, Socal 44-L or Esso HAN (all commercially available).

The compounds of this invention may also be applied in combination with other essentially technical materials, such as malathion, which in addition to having insecticidal properties also serve as a formulation vehicle.

The following examples are provided to further illustrate the invention.

EXAMPLE 1

Preparation of O,O-diethyl O-1-methyl-2-(phenyl-thio)vinyl phosphorothioate

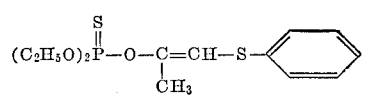

To an ice-cooled stirred mixture of 8.0 g. of phenylthio-2-propanone and 5.4 g. of potassium t-butoxide in 160 ml. of dimethyl sulfoxide was added 9.1 g. of O,O-diethyl phosphorochloridothioate. The reaction was complete within one minute and was poured into water. The product was extracted out with methylene chloride and the methylene chloride mixture was water-washed and dried with sodium sulfate. Concentration in vacuo left 12.0 g. (79%) of crude product. The nuclear magnetic resonance spectrum showed that this material was about 75% "trans" isomer and about 25% of "cis" isomer. The isolation of the major trans isomer was effected by chromatography on magnesium silicate (Florisil) eluting with petroleum ether and methylene chloride-petroleum ether mixtures and isolated as an oil, $n_D^{25}=1.5497$.

The proton magnetic resonance spectrum was consistent with the structure with signals at 2.7τ (aromatic), 3.9τ (olefin C—H), 5.8τ (O—CH₂—), 7.85τ (CH₃—C=), and 8.67τ (CH₃—CH₂).

*Analysis.*—Calcd. for $PS_2O_3C_{13}H_{19}$ (percent): C, 49.06; H, 5.97; P, 9.74; S, 20.15. Found (percent): C, 49.30; H, 6.14; P, 9.58; S, 20.32.

EXAMPLE 2

The cis isomer of the compound of Example 1 was prepared in a manner similar to that shown in Example 1 by continuing to elute the magnesium silicate until substantially pure cis isomer was produced.

EXAMPLE 3

Preparation of O,O-dimethyl O-1-methyl-2-(phenylthio)vinyl phosphorothioate

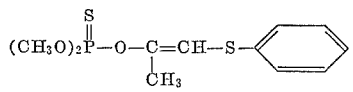

Following substantially the same procedure as in Example 1, the above compound was prepared in a crude yield of 88%. The isolated 100% pure trans isomer analyzed as follows:

*Analysis.*—Calcd. for $PS_2O_3C_{11}H_{15}$ (percent): C, 45.5; H, 5.2; P, 10.7. Found (percent): C, 46.4; H, 5.2; P, 10.9.

EXAMPLE 4

Preparation of O,O-diethyl O-1-methyl-2-(4-chlorophenylthio)vinyl phosphorothioate

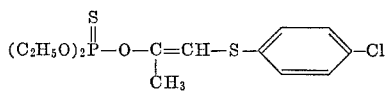

To a stirred mixture of 10.0 g. of p-chlorophenylthioacetone in 150 ml. of dimethylformamide was added 3.9 g. of ground potassium hydroxide. This was followed by the addition of 9.4 g. of O,O-diethyl phosphorochloridothioate over a 15 minute period during which a cooling bath was used to maintain a reaction temperature of 20 to 30° C. After stirring an additional 10 minutes, the mixture was poured into water and extracted with benzene. The benzene layer was water-washed and then concentrated in vacuo to give 15.8 g. (91% of theory) of product as an orange-brown oil. Analysis by gas-liquid chromatography showed that the crude product was about 90% pure O,O-diethyl O-1-methyl-2-(p-chlorophenylthio)vinyl phosphorothioate. The nuclear magnetic resonance spectrum showed that the relative amounts of trans and cis isomer were 68% and 32%, based on the relative strength of the vinyl hydrogen signals at $4.0\tau$ and $4.4\tau$ respectively.

Column chromatography of 12 g. of such a mixture on 200 g. of Florisil using petroleum ether-methylene chloride mixtures for elution gave 4.6 g. of 95% pure trans isomer. The product was a colorless oil having the following analysis:

Trans-O,O-diethyl O-1-methyl-2-(p-chlorophenylthio)-vinyl phosphorothioate, $n_D^{25}=1.5590$.

*Analysis.*—Calcd. for $C_{13}H_{18}ClPO_3S_2$ (percent): C, 44.27; H, 5.10; Cl, 10.06; P, 8.78. (Found): C, 44.24; H, 5.16; Cl, 10.39; P, 8.93; S, 19.05.

EXAMPLE 5

1.5 grams of the cis isomer of the compound of Example 4 were prepared in 95% purity by continuing to elute the Florisil column of Example 1. The product was a colorless oil having the following analysis:

Cis - O,O - diethyl O-1-methyl-2-(4-chlorophenylthio)-vinyl phosphorothioate, $n_D^{25}=1.5651$.

*Analysis.*—Found (percent): C, 44.46; H, 5.14; Cl, 10.67; P, 9.32; S, 19.56.

EXAMPLES 6 TO 24

Following substantially the same procedure as given in Example 4 and the isomer separation techniques of Examples 1 and 2, a variety of chlorophenyl derivatives of the inventive compound in substantially pure trans and cis form, as well as mixtures of trans and cis were prepared. These derivatives and certain of their properties are shown below in Table I.

TABLE I.—CHLOROPHENYL DERIVATIVES OF THE COMPOUNDS OF THIS INVENTION

| Example No. | $R_1$ | $R_2$ | $R_3$ | m | X=Cl 2[1] | 3[1] | 4[1] | 5[1] | 6[1] | Crude yield, percent | Isomer form | Calcd. C | H | P | Found C | H | P |
|---|---|---|---|---|---|---|---|---|---|---|---|---|---|---|---|---|---|
| 6 | $CH_3$ | $CH_3$ | $CH_3$ | 1 | | | Cl | | | 87 | 100% trans | 40.7 | 4.3 | 9.5 | 40.6 | 4.1 | 9.8 |
| 7 | i-$C_3H_7$ | i-$C_3H_7$ | $CH_3$ | 1 | | | Cl | | | 90 | do | 47.3 | 5.8 | 8.1 | 46.8 | 5.9 | 8.0 |
| 8 | $C_2H_5$ | $C_2H_5$ | $CH_3$ | 1 | Cl | | | | | 88 | do | 44.3 | 5.1 | 8.8 | 45.0 | 5.4 | 9.2 |
| 9 | $CH_3$ | $CH_3$ | $CH_3$ | 1 | Cl | | | | | 83 | do | 40.7 | 4.3 | 9.5 | 40.8 | 4.4 | 9.6 |
| 10 | $CH_3$ | $CH_3$ | $CH_3$ | 1 | | Cl | | | | 79 | do | 40.7 | 4.3 | 9.5 | 40.9 | 4.4 | 9.7 |
| 11 | $C_2H_5$ | $C_2H_5$ | $CH_3$ | 2 | Cl | | | Cl | | 82 | do | 40.3 | 4.4 | 8.0 | 40.4 | 4.2 | 8.2 |
| 12 | $CH_3$ | $CH_3$ | $CH_3$ | 2 | Cl | | | Cl | | 88 | do | 36.8 | 3.7 | 8.6 | 36.9 | 3.7 | 8.5 |
| 13 | $CH_3$ | $CH_3$ | $CH_3$ | 2 | Cl | | | | Cl | 84 | 95% trans | 36.8 | 3.7 | 8.6 | 36.8 | 3.8 | 8.7 |
| 14 | $CH_3$ | $CH_3$ | $CH_3$ | 2 | Cl | Cl | | | | 76 | 100% trans | 36.8 | 3.7 | 8.6 | 37.1 | 3.7 | 8.9 |
| 15 | $CH_3$ | $CH_3$ | $CH_3$ | 2 | Cl | | | Cl | | 89 | do | 36.8 | 3.7 | 8.6 | 38.3 | 3.7 | 8.4 |
| 16 | $CH_3$ | $CH_3$ | $CH_3$ | 2 | | Cl | Cl | | | 93 | do | 36.8 | 3.7 | 8.6 | 37.4 | 3.7 | 8.8 |
| 17 | $CH_3$ | $CH_3$ | $CH_3$ | 2 | | Cl | | Cl | | 90 | do | 36.8 | 3.7 | 8.6 | 36.7 | 3.8 | 8.9 |
| 18 | $CH_3$ | $CH_3$ | $CH_3$ | 1 | | | Cl | | | 87 | 95–100% cis | 40.7 | 4.3 | 9.5 | 40.99 | 4.44 | 9.64 |
| 19 | $C_2H_5$ | $C_2H_5$ | $CH_3$ | 1 | Cl | | | | | 88 | 93% cis | 44.3 | 5.1 | 8.8 | 44.44 | 5.08 | 9.31 |
| 20 | $C_2H_5$ | $C_2H_5$ | $CH_3$ | 2 | Cl | | | Cl | | 82 | 95–100% cis | 40.3 | 4.4 | 8.0 | 40.57 | 4.41 | 8.34 |
| 21 | $CH_3$ | $CH_3$ | $CH_3$ | 2 | Cl | | | Cl | | 88 | do | 86.8 | 3.7 | 8.6 | 36.17 | 3.64 | 8.71 |
| 22 | $C_2H_5$ | $C_2H_5$ | $CH_3$ | 1 | | Cl | | | | 87 | 75% cis / 25% trans | 44.3 | 5.1 | 8.8 | 44.7 | 5.3 | 9.0 |
| 23 | $CH_3$ | $CH_3$ | $CH_3$ | 3 | Cl | | Cl | | Cl | 2[2] 81 | 72% trans / 28% cis | 33.6 | 3.1 | | 34.7 | 3.0 | |
| 24 | $CH_3$ | $CH_3$ | $CH_3$ | 3 | Cl | | Cl | Cl | | 2[2] 85 | 62% trans / 38% cis | 33.6 | 3.1 | | 34.1 | 3.1 | |

[1] Denotes position on the phenyl ring in accordance with numbering of Formula (I). For the compounds given, positions 2 and 6 are equivalent and positions 3 and 5 are equivalent.
[2] Purified by molecular distillation.

EXAMPLE 25

Preparation of O,O-diethyl 0-1-methyl-2-(4-nitrophenylthio)vinyl phosphorothioate

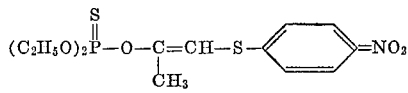

To a stirred mixture of 15.0 g. of 4-nitrophenylthio-2-propanone in 200 ml. of dimethylsulfoxide was added 6.3 g. of potassium t-butoxide with cooling. After adding 10.5 g. of O,O-diethyl phosphorochloridothioate, with cooling of the reaction flask, the mixture had become essentially neutral within two minutes. The mixture was then poured into water and the product extracted with methylene chloride. The isolated product amounted to 22.0 g. of a dark red oil. A fraction was collected by chromatography on Florisil comprising pure product in a 60:40 trans to cis isomer ratio.

Analysis.—Calcd. for $C_3H_{18}NO_5PS_2$ (percent): C, 43.20; H, 4.98; N, 3.32; P, 8.58; S, 17.76. Found (60% trans; 40% cis) (percent): C, 42.36; H, 5.09; N, 3.79; P, 8.69; S, 19.00.

EXAMPLE 26

The 100% pure cis isomer of the product of Example 23 was prepared by further elution of the Florisil column in Example 23.

Analysis.—Calcd. for $C_3H_{18}NO_5PS_2$ (percent): C, 43.20; H, 4.98; N, 3.32; P, 8.58; S, 17.76. Found (100% cis) (percent): C, 43.22; H, 5.00; N, 3.88; P, 9.11; S, 19.14.

EXAMPLE 27

Preparation of O,O-dimethyl-O-1-methyl-2-(4-Nitrophenylthio)vinyl phosphorothioate

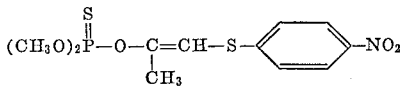

Following substantially the same procedure as in Example 25, the above compound was prepared in 79% crude yield. The product was 64% trans and 36% cis and analyzed as follows:

Analysis.—Calcd. for: $PS_2O_5C_{11}H_{14}$ (percent): C, 39.4; H, 4.2; P, 9.3. Found (percent): C, 40.2; H, 4.2; P, 9.4.

EXAMPLE 28

Preparation of O,O-dimethyl-O-1-methyl-2-(4-fluorophenylthio)vinyl phosphorothioate

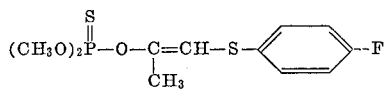

To a stirred mixture of 25.0 g. of 4-fluorophenylthio-2-propanone in 200 ml. of dimethylsulfoxide was added 15.1 g. of potassium t-butoxide with cooling. After adding 21.7 g. of O,O-dimethyl phosphorochloridothioate, with cooling of the reaction flask, the mixture had become essentially neutral within two minutes. It was poured into water and the product was extracted with methylene chloride. The yield of crude product was 39.0 g. which showed only minor contamination by thin layer chromatography on silica gel. Chromatography on Florisil gave 10.8 g. of 95% trans product in the early fractions collected.

Analysis.—Calcd. for $C_{11}H_{14}FO_3PS_2$ (percent): C, 42.84; H, 4.54; P, 10.05; S, 20.82. Found (trans) (percent): C, 42.83; H, 4.30; P, 9.43; S, 20.81.

EXAMPLE 29

0.5 gram of pure cis isomer of the compound of Example 28 was prepared by continuing to elute the Florisil column of Example 28.

Analysis.—Calcd. for $C_{11}H_{14}FO_3PS_2$ (percent): C, 42.84; H, 4.54; P, 10.05; S, 20.82. Found (cis) (percent): C, 43.75; H, 4.50; P, 9.39; S, 19.60.

EXAMPLE 30

Preparation of O,O-diethyl-O-1-methyl-2-(4-fluorophenylthio)vinyl phosphorothioate

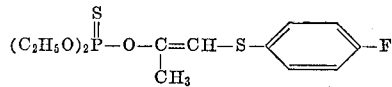

To a stirred mixture of 15.0 g. of 4-fluorophenylthio-2-propanone in 180 ml. of dimethylsulfoxide was added 9.2 g. of potassium t-butoxide with cooling. After adding 15.4 g. of O,O-diethyl phosphorochloridothioate, with cooling of the reaction flask, the mixture had become essentially neutral within two minutes. It was poured into water and the product was extracted with methylene chloride. After water-washing and drying over magnesium sulfate, the mixture was concentrated under vacuum to give 24.2 g. of product as an orange-brown liquid. The nuclear magnetic resonance spectrum indicated that the material was of good purity and contained 67% of the trans and 33% of the cis isomer. Fifteen grams of this material was chromatographed on Florisil to yield 4.6 g. of pure trans.

Analysis.—Calcd. for $C_{13}H_{18}FPO_3S_2$ (percent): C, 46.44; H, 5.35; P, 9.21; S, 19.07. Found (trans) (percent): C, 46.90; H, 5.39; P, 9.93; S, 20.40.

EXAMPLE 31

4.6 grams of pure cis isomer of the compound of Example 30 were isolated by continuing to elute the Florisil column in Example 30.

Analysis.—Calcd. for $C_{13}H_{18}FPO_3S_2$ (percent): C, 46.44; H, 5.35; P, 9.21; S, 19.07. Found (cis) (percent): C, 47.20; H, 5.35; P, 9.01; S, 18.90.

COMPARATIVE EXAMPLE 1

Activity of chlorophenyl compounds as a mosquito larvicide

A variety of the chlorophenyl compounds of this invention and a potent prior art chlorophenyl compound were evaluated for mosquito larvicidal properties in accordance with the following procedures.

Common malaria mosquito—*Anopheles quadrimaculatus* Say.—Larvicide Test

Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 p.p.m. emulsion is diluted ten-fold with 65% acetone-35% water to give 100 p.p.m. One milliliter of the 100 p.p.m. emulsion is pipetted in a sufficient amount of water to produce the desired concentration (expressed as p.p.m.) upon addition thereto of the larvae in 25 ml. of water. Mortality counts are made after 24 hours at 80° F.

LC-50 values are obtained in the standard manner by plotting percent mortality as a function of the compound concentrations for a variety of concentrations. The term LC-50 means the concentration expressed in p.p.m. required to kill 50% of the mosquito larvae. Results are shown below in Table II.

TABLE II.—ACTIVITY AGAINST MOSQUITO LARVAE

| Compound as prepared in Example No. | | Mosquito larvae Percent mortality at— | | LC-50 (p.p.m.) |
|---|---|---|---|---|
| | | .01 p.p.m. | .001 p.p.m. | |
| Prior art [1] | $(C_2H_5O)_2\overset{O}{\overset{\|}{P}}-O-\overset{CH_3}{\overset{\|}{C}}=CH-S-\underset{}{\bigcirc}-Cl$ | 0 | 0 | .017 |
| Monochlorophenyl (trans) | 4 [2] | 100 | 60 | .00120 |
| | 6 | 100 | 90 | .0014 |
| | 8 | 100 | 12 | .0015 |
| | 9 | 100 | 20 | .0018 |
| | 10 | 100 | 0 | |
| | 11 | 100 | 0 | .0048 |
| | 12 | 100 | 36 | .0013 |
| | 13 | 100 | 0 | .0036 |
| Dichlorophenyl (trans) | 14 | 100 | 76 | .00115 |
| | 15 | 100 | 60 | |
| | 16 | 100 | 30 | .00135 |
| | 17 | 100 | 36 | .0014 |
| Monochlorophenyl (cis) | 5 [2] | 100 | 0 | .0066 |
| | 18 | 100 | 80 | |
| | 19 | 100 | 0 | .0048 |
| Dichlorophenyl (cis) | 21 | 100 | 0 | |
| Monochlorophenyl (trans and cis) | 22 | 100 | 0 | |
| Trichlorophenyl (trans and cis) | 23 | 100 | 0 | |
| | 24 | 100 | 0 | .0056 |

[1] Prepared by the recipe of Example 4 of South African Patent 66/5,096 except using a p-chlorophenyl reactant.
[2] The sulfur analog of the prior art compound.

As can be seen from the above data, the chlorophenyl compounds of this invention are significantly more active against mosquito larvae than the compound of the prior art. In interpreting the LC–50 data, it must be remembered that the lower the value the more potent the compound since the objective is to destroy the larvae. This, of course, is in contrast to the usual mammalian toxicity data wherein higher values are desirable since they are an indication of lower toxicity towards human beings.

An analysis of the LC–50 data indicates the compounds of this invention to be from 2.6 to 15 times more toxic toward mosquito larvae than the prior art compound. The compound of Example 4 is the sulfur analog of the prior art compound; yet it is 14 times more toxic towards mosquito larvae than the prior art compound, serving to clearly indicate the unusually high potency of the inventive compounds as mosquito larvicides.

COMPARATIVE EXAMPLE 2

Activity of chlorophenyl compounds against insects of the "cotton complex"

The compounds of this invention have been found to possess an unusually high activity against certain pests which ravage cotton and other economic crops. Such pests will be referred to hereafter as the "cotton complex" of insects, said "cotton complex" comprising insects selected from the group consisting of lygus, tobacco budworm, bollworm, and boll weevil. The boll weevil is essentially a cotton pest; however, lygus, tobacco budworm and bollworm not only ravage cotton, but also such important economic crops as beans, soybeans, green beans, snapbeans, corn, alfalfa, tomatoes, tobacco, safflower, and clover. Thus, despite classification within the "cotton complex," it must be understood that lygus, tobacco budworm, and bollworm are a threat to a variety of crops in addition to cotton, and that the unusually high potency shown by the compounds of this invention is directed toward the insects of the "cotton complex" per se and is substantially independent of the vegetative environment in which the insect happens to be found.

The "cotton complex" of pests is known to be extremely difficult to destroy by treatment with chemical agents. This difficulty is believed due to the ability of these particular insects to develop a resistance to the various chemicals used against them.

A variety of the chlorophenyl compounds of this invention and a potent prior art chlorophenyl compound were evaluated for activity against the "cotton complex" in accordance with the following procedures.

(A) Tarnished plant bug—*Lygus lineolaris*
(Parisot de Beauvois)

Test compounds are prepared as 1000 p.p.m. solutions in 10% acetone, 0.2% Alrodyne 315, and 89.8% water. A ten-fold dilution is made with 65% acetone and 35% water. The primary leaves of Sieva lima bean plants are dipped for 3–5 seconds in the test solutions and placed in an exhaust hood to dry. When dry, each leaf is placed in a 4-inch petri dish with a moist filter paper on the bottom. Ten adult Lygus bugs are aspirated from the stock culture and placed in the petri dish. The dishes are covered and held at 80° F. and 60% R.H. After 2 days, mortality counts are made.

(B) Boll Weevil—*Anthonomus grandis* Boheman

Test compounds are prepared as 1000 p.p.m. solutions in 10% acetone, 0.2% Alrodyne 315, and 89.8% water. A ten-fold dilution is made with 65% acetone and 35% water. The first or second true leaf of young cotton plants is dipped for 3–5 seconds in the test solution and placed in an exhaust hood to dry. When dry, each leaf is placed in a 4-inch petri dish with a moist filter paper on the bottom. Ten adult boll weevils are removed from the stock culture and placed in the petri dish. The dishes are covered and held at 80° F. and 60% r.h. After 2 days, mortality counts are made.

(C) Tobacco Budworm—*Heliothis virescens*
(Fabricius)

Test compounds are prepared as 1000 p.p.m. solutions in 65% acetone and 35% water. Cotyledons of young cotton plants are dipped for 3–5 seconds in the test solution and placed in an exhaust hood to dry. When dry, a leaf is placed in a one-ounce plastic medicine cup containing one dental wick saturated with water and two 3rd instar tobacco budworms. The cup is capped and held at 80° F. and 60% R.H. After two days, mortality counts are made.

Results are presented below in Table III.

TABLE III.—ACTIVITY AGAINST THE COTTON COMPLEX

| Compound as prepared in example No. | | Percent mortality | | |
|---|---|---|---|---|
| | | Lygus, 100 p.p.m. | Boll weevil, 100 p.p.m. | Budworm 1,000 p.p.m. |
| Prior art [1] | 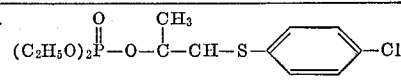 | 20 | 40 | 0 |
| Monochlorophenyl (trans) | 4[2] | 100 | 100 | 25 |
| | 6 | 100 | 100 | 100 |
| | 8 | 100 | 100 | 30 |
| | 9 | 100 | 90 | 90 |
| | 10 | 100 | 100 | 80 |
| Dichlorophenyl (cis) | 12 | 80 | 100 | 30 |
| | 13 | 100 | 100 | 60 |
| | 14 | 80 | 100 | 40 |
| | 15 | 100 | 100 | 40 |
| | 16 | 50 | 100 | 100 |
| | 17 | 100 | 100 | 80 |
| Monochlorophenyl (cis) | 18 | 100 | 100 | 100 |
| Dichlorophenyl (cis) | 21 | 100 | 90 | 60 |
| Trichlorophenyl (trans and cis) | 23 | 50 | 80 | 50 |
| | 24 | 0 | 100 | 100 |

[1] Prepared by the recipe of Example 4 of South African Patent 66/5,096 except using a p-chloropehnyl reactant.
[2] The sulfur analog of the prior art compound.

As can be seen from the data of Table III, the compounds of this invention exhibit very high potency toward all three of the difficulty controlled insect species evaluated compared to the low potency of the prior art compound which has no activity against budworm and no significant activity against lygus or boll weevil. The inventive compounds, on the other hand, give for the most part substantially complete control of lygus and boll weevil while simultaneously also giving varying control over the budworm. The compound of Example 4 is the sulfur analog of the prior art compound; yet it is 5 times more potent against lygus, 2.5 times more potent against boll weevil, and gives 25% control vs. no control of budworm as compared to the prior art compound. Certain of the chlorophenyl derivatives of this invention, i.e. the compounds of Examples 6, 9, 10, 17, and 18 give substantially complete control over all three insect species.

EXAMPLE 32

Insecticidal and acaricidal activity of the phenyl, nitrophenyl, and fluorophenyl compounds of this invention.—(A) Bean aphid—*Aphis fabae* Scopoli.

Compounds are tested as .001% solutions or suspensions in 65% acetone-35% water. Two-inch fiber pots, each containing a nasturtium plant two inches high and infested with about 150 aphids two days earlier, are placed on a turntable (4 r.p.m.) and sprayed for two revolutions with a No. 154 DeVilbiss Atomizer at 20 p.s.i. air pressure. The spray tip is held about six inches from the plants and the spray is directed so as to give complete coverage of the aphids and the plants. The sprayed plants are laid on their sides on white enamel trays. Mortality estimates are made after holding for two days at 70° F. and 50% R.H.

(B) Southern armyworm—*Prodenia eridania* (Cramer)

The solutions from the aphid test are diluted to a .01% solution and used for this one. Sieva lima bean primary leaves are dipped for three seconds in the test solution and set in a hood on a screen to dry. When dry, each leaf is placed in a 4-inch petri dish which has a moist filter paper in the bottom and ten third-instar armyworm larvae about ⅜" long. The dishes are covered and held at 80° F., and 60% R.H. After two days, mortality counts and estimates of the amount of feeding are made. Compounds showing partial kill and/or inhibition of feeding are held an extra day for further observations.

(C) Two-spotted spider mite—*Tetranychus urticae* (Koch)

Sieva lima bean plants with primary leaves three to four inches long are infested with about 100 adult mites per leaf four hours before use in this test. The mite and egg infested plants are dipped for three seconds in the same solutions used in the aphid test, and the plants set in the hood to dry. They are held for two days at 80° F. 60% R.H., and the adult mite mortality estimated on one leaf under a stereoscopic microscope. The other leaf is left on the plant an additional five days and then examined at 10X power to estimate the kill of eggs and of newly-hatched nymphs, giving a measure of ovicidal and residual action, respectively.

(D) Confused flour beetle—*Tribolium confusum* Jacquelin duVal

Compounds are formulated as 1% ducts by mixing 0.1 gram of the compound with 9.9 grams of Pyrax ABB talc, wetting with 5 ml. of acetone and grinding with a mortar and pestle until dry. 125 mg. of this 1% dust is then blown into the top of a dust settling tower with a short blast of air at 20 p.s.i. The dust is allowed to settle on four-inch petri dishes for two minutes, giving a deposit of approximately 87 mg./sq. foot (.094 mg./sq. cm.) of the 1% dust. The dishes are removed and 25 adult confused flour beetles are added immediately. The dishes are held for three days at 80° F. and 60% R.H., following which mortality counts are made.

(E) Large mildweed bug—*Oncopeltus fasciatus* Dallas

The 1% dusts described above are used in this test. 25 mg. of the 1% dust is sprinkled evenly over the glass bottom of a seven-inch diameter cage, using a screen-bottom plastic cup about ⅝-inch diameter as an applicator, giving a deposit of approximately 94 mg./sq. ft. (.108 mg./sq. cm.) of the 1% dust. Water is supplied in a two-ounce bottle with a cotton wick, twenty adult bugs are added and a screen cover placed on the top. Mortality counts are made after holding for three days at 80° F. and 60% R.H.

(F) German cockroach—*Blattella germanica* (Linnaeus)

The procedure is the same as for the large milkweed bug test, except that in this test only adult males are used.

(G) Common malaria mosquito—*Anopheles quadrimaculatus* (Say)

(1) Larvicide test

This is the same test given in Comparative Example 1.

(2) Adulticide test

Test compounds are prepared as 10 p.p.m. solutions in acetone. Glass microscope slides are dipped in the test solutions and allowed to dry in a horizontal position. When dry, they are individually placed in four-ounce wide mouth bottles and ten 4 to 5 day old mosquitoes of mixed sexes are added to each bottle. A piece of cotton gauze serves as a lid, and a wad of cotton soaked in 10% sugar solution serves as food. Mortality counts are made after 24 hours of continuous exposure to the residue on the glass slide; temperature is 80° F. and R.H. is 60%.

(H) Housefly—*Musca domestica* Linnaeus

Groups of 25 adult female houseflies are lightly anesthetized with $CO_2$, placed in wide-mouth pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10% sugar solution in a 10-gram glass vial, giving a concentration of 50 p.p.m. The mouth of the vial is covered with a single layer of cheesecloth, inverted and placed on the screen cap, so that the flies can feed on the solution through the screen. Mortality counts are made after two days at 80° F.

(I) Southern corn rootworm—*Diabrotica undecimpunctata howardi* Barber

The compound is formulated as a dust and incorporated into the soil at the equivalent of 10 pounds per 6-inch acre. The soil is sub-sampled into one-ounce wide mouth bottles, and ten 6 to 8 day old rootworm larvae added to each bottle, which is then capped. Mortality counts are made after six days at 80° F., 60% R.H.

(J) False wireworm—*Eleodes suturalis* (Say)

The test is the same as with the rootworms except that 10-day old wireworm larvae are used.

(K) Tarnished plant bug—*Lygus lineolaris* (Palisot de Beauvois) (L) Boll weevil—*Anthonomus grandis* Boheman (M) Tobacco budworm—*Heliothis virescens* (Fabricius)

The tests for insect species K, L, and M are the same as given in Comparative Example 2.

Results are shown below in Table IV.

The data of Table IV indicate that the compounds are very active against mosquito larvae; certain compounds, particularly the fluorophenyl compounds, exhibit high potency against insects of the cotton complex.

The chlorophenyl compounds of this invention such as those illustrated in Table I hereabove exhibit activity against insects and acarina such as aphids, southern armyworms, mites, confused flour beetles, milkweed bugs, German cockroaches, adult mosquitoes, flies, rootworms, and wireworms, which is similar to that shown in Table IV.

We claim:
1. A phenyl thiovinyl phosphorothioate compound of the formula:

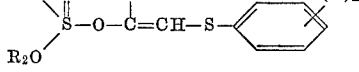

to include either the trans or cis form of said compounds and mixtures of the trans and cis form, wherein:

$R_1$, $R_2$, and $R_3$ are each lower alkyl,
X is selected from the group consisting of chloro, fluoro and nitro, and
m is 0 or 1, except that where X is chloro, m is 1 to 3.

2. The compound of claim 1:

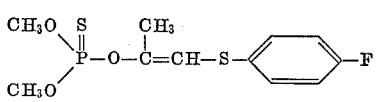

3. The compound of claim 1:

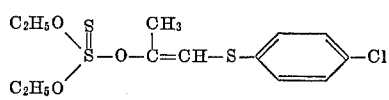

TABLE IV.—INSECTICIDAL AND ACARICIDAL ACTIVITY OF THE PHENYL, NITROPHENYL, AND FLUOROPHENYL COMPOUNDS OF THIS INVENTION (EXPRESSED AS PERCENT MORTALITY)

| Compounds as prepared in example No. | Aphid, 10 p.p.m. | S.A.W.,[1] 100 p.p.m. | Mites, 10 p.p.m. | TC,[2] 1% | MB,[3] 1% | GC,[4] 1% | Mosquito Larvae, .01 p.p.m. | Mosquito Adults, 10 p.p.m. | Fly, 50 p.p.m. | R.W.,[5] 10 lb./acre | W.W.,[6] 10 lb./acre | Lygus, 100 p.p.m. | Boll weevil, 100 p.p.m. | Budworm, 1,000 p.p.m. |
|---|---|---|---|---|---|---|---|---|---|---|---|---|---|---|
| Phenyl: | | | | | | | | | | | | | | |
| 1 | 100 | 100 | 95 | 100 | 100 | 100 | 100 | 100 | 100 | 100 | 100 | 100 | 90 | |
| 2 | 95 | 70 | 81 | 24 | 100 | 0 | 100 | 90 | 100 | 100 | 100 | 0 | 20 | 50 |
| 3 | 100 | 100 | 100 | 100 | 100 | 100 | 100 | 100 | 100 | 100 | 100 | 100 | 100 | 100 |
| Nitrophenyl: | | | | | | | | | | | | | | |
| 25 | 100 | 100 | 100 | 100 | 90 | 100 | 100 | 100 | 100 | 100 | 100 | 50 | 70 | 60 |
| 26 | 100 | 20 | 98 | 100 | 75 | 100 | 32 | 0 | 100 | 100 | 40 | 0 | 50 | 0 |
| 27 | 100 | 60 | 100 | 100 | 100 | 100 | 100 | 100 | 100 | 100 | 100 | 100 | 100 | 100 |
| Fluorophenyl: | | | | | | | | | | | | | | |
| 28 | 100 | 100 | 100 | 100 | 100 | 85 | 100 | 100 | 100 | 100 | 100 | 100 | 100 | 100 |
| 29 | 100 | 100 | 100 | 100 | 100 | 100 | 96 | 100 | 100 | 100 | 100 | 100 | 100 | 90 |
| 30 | 100 | 100 | 100 | 100 | 100 | 100 | 100 | 100 | 100 | 100 | 100 | 100 | 60 | 80 |

[1] S.A.W.=Southern Armyworm. [2] TC=*Tribolium confusum* (confused flour beetle). [3] MB=Milkweed Bug. [4] GC=German Cockroach. [5] R.W.=Rootworm. [6] W.W.=Wireworm.

4. The compound of claim 1:

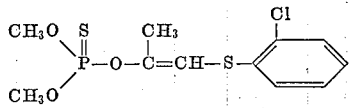

5. The compound of claim 1:

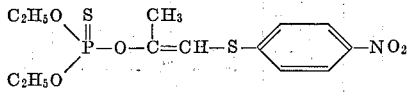

6. A process for preparing a trans enriched mixture of cis-trans phenylthiovinyl phosphorothioates of the formula:

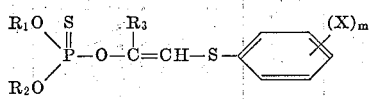

wherein $R_1$, $R_2$, and $R_3$ are each lower alkyl, X is selected from the group consisting of chloro, fluoro and nitro, and $m$ is 0 or 1, except that where X is chloro, $m$ is 1 to 3, comprising the steps of reacting an α-phenylthioketone of the formula:

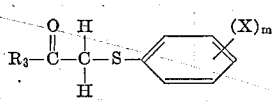

wherein X and $m$ are as defined above;
with a phosphorothioate of the formula:

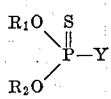

wherein $R_1$, $R_2$, $R_3$ and Y are as defined above, in the presence of a polar organic solvent selected from the group consisting of dimethylsulfoxide and dimethylformamide and a strong base selected from the group consisting of alkali metal hydroxides and alkali metal alkoxides at a reaction temperature in the range of from 0° C. to 100° C.

7. A process according to claim 6 wherein the vinyl phosphorothioate is O,O - diethyl O-1-methyl-2-(phenylthio)vinyl phosphorothioate, the ketone is phenylthio-2-propanone, the phosphorothioate is O,O-diethyl phosphorochloridothioate, the base is potassium t-butoxide, the solvent is dimethyl sulfoxide and the reaction temperature is in the range of 10° C. to 40° C.

8. A process according to claim 6 wherein the vinyl phosphorothioate is O,O-diethyl O-1-methyl-2-(4-chlorophenylthio)vinyl phosphorothioate, the ketone is p-chlorophenylthioacetone, the solvent is dimethylformamide, the base is potassium hydroxide and the phosphorothioate is O,O-diethyl phosphorochloridothioate and the reaction temperature is from 10° C. to 40° C.

9. A process according to claim 6 wherein the vinyl phosphorothioate is O,O-diethyl O-1-methyl-2-(4-nitrophenylthio)vinyl phosphorothioate, the ketone is 4-nitrophenylthio-2-propinone, the solvent is dimethylsulfoxide, the base is potassium t-butoxide, the phosphorothioate is O,O-diethyl phosphorochloridothioate and the reaction temperature is from 10° C. to 40° C.

10. A process according to claim 6 wherein the vinyl phosphorothioate is O,O-dimethyl O-1-methyl-2-(4-fluorophenylthio)vinyl phosphorothioate, the ketone is 4-fluorophenylthio-2-propinone, the solvent is dimethyl sulfoxide, the base is potassium t-butoxide, the phosphorothioate is O,O-dimethyl phosphorochloridothioate and the reaction temperature is from 10° C. to 40° C.

References Cited

UNITED STATES PATENTS 3,077,431   2/1963   Baker et al. _____ 260—972 X

FOREIGN PATENTS 1,497,955   10/1967   France _____ 260—949

CHARLES B. PARKER, Primary Examiner

A. H. SUTTO, Assistant Examiner

U.S. Cl. X.R.

260—972, 989; 424—216

UNITED STATES PATENT OFFICE
CERTIFICATE OF CORRECTION

Patent No. 3,632,862  Dated January 4, 1972

Inventor(s) Roger Williams Addor and Thomas Walter Drabb, Jr.

It is certified that error appears in the above-identified patent and that said Letters Patent are hereby corrected as shown below:

Column 1, lines 36 and 37,

" $\begin{array}{c} R_1O \\ R_2O \end{array} \!\!\! \stackrel{P}{\underset{\parallel}{>}} P-$ " should read -- $\begin{array}{c} R_1O \\ R_2O \end{array} \!\!\! \stackrel{S}{\underset{\parallel}{>}} P-$ --.

Column 1, line 44, "0 to 1" should read -- 0 or 1 --.

Column 2, line 20, "relates" should read -- related --.

Column 12, line 34, "ducts" should read -- dusts --.

Column 13, lines 54 and 55,

" $\begin{array}{c} R_1O \\ R_2O \end{array} \!\!\! \stackrel{S}{\underset{\parallel}{>}} S-$ " should read -- $\begin{array}{c} R_1O \\ R_2O \end{array} \!\!\! \stackrel{S}{\underset{\parallel}{>}} P-$ --.

Column 13, lines 73 and 74,

" $\begin{array}{c} C_2H_5O \\ C_2H_5O \end{array} \!\!\! \stackrel{S}{\underset{\parallel}{>}} S-$ " should read -- $\begin{array}{c} C_2H_5O \\ C_2H_5O \end{array} \!\!\! \stackrel{S}{\underset{\parallel}{>}} P-$ --.

Signed and sealed this 23rd day of May 1972.

(SEAL)
Attest:

EDWARD M. FLETCHER, JR.
Attesting Officer

ROBERT GOTTSCHALK
Commissioner of Patents